United States Patent
Cheong et al.

(10) Patent No.: US 9,420,295 B2
(45) Date of Patent: Aug. 16, 2016

(54) JOINT MODE DECISION WITH SHARED BIT-BUDGET CONDITION

(71) Applicant: SONY CORPORATION, Tokyo (JP)

(72) Inventors: Hye-Yeon Cheong, Milpitas, CA (US); Ali Tabatabai, Cupertino, CA (US); Masaru Ikeda, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 209 days.

(21) Appl. No.: 14/323,897

(22) Filed: Jul. 3, 2014

(65) Prior Publication Data

US 2015/0201196 A1    Jul. 16, 2015

Related U.S. Application Data

(60) Provisional application No. 61/925,901, filed on Jan. 10, 2014.

(51) Int. Cl.

| | |
|---|---|
| *H04N 19/124* | (2014.01) |
| *H04N 19/184* | (2014.01) |
| *G06K 9/36* | (2006.01) |
| *H04N 19/176* | (2014.01) |
| *H04N 19/119* | (2014.01) |
| *H04N 19/103* | (2014.01) |
| *H04N 19/146* | (2014.01) |
| *H04N 19/186* | (2014.01) |

(52) U.S. Cl.
CPC .......... *H04N 19/124* (2014.11); *H04N 19/103* (2014.11); *H04N 19/119* (2014.11); *H04N 19/146* (2014.11); *H04N 19/176* (2014.11); *H04N 19/186* (2014.11)

(58) Field of Classification Search
CPC . H04N 19/176; H04N 19/146; H04N 19/103; H04N 19/119; H04N 19/186
USPC ....................................................... 375/240.03
See application file for complete search history.

(56) References Cited

U.S. PATENT DOCUMENTS

| | | |
|---|---|---|
| 5,144,423 A | 9/1992 | Knauer et al. |
| 2005/0265459 A1 | 12/2005 | Bhattacharjya et al. |
| 2010/0309984 A1 | 12/2010 | Liu et al. |
| 2011/0229047 A1* | 9/2011 | Shimauchi ........... H04N 19/647 382/233 |
| 2013/0010864 A1 | 1/2013 | Teng |
| 2013/0077881 A1* | 3/2013 | Kodama ............... H04N 19/176 382/233 |

* cited by examiner

*Primary Examiner* — Hee-Yong Kim
(74) *Attorney, Agent, or Firm* — O'Banion & Ritchey LLP; John P. O'Banion

(57) ABSTRACT

Apparatus and method for optimizing encoding and decoding when using embedded block coding, in which each block is independent coded is described. Instead of coding the whole block in response to a single mode decision, the block is separated into multiple sub-blocks sharing the same block bit budget. A block is divided for example in response to color or spatial considerations. A joint mode decision is then made where mode (DPCM/PCM) as well as qn are independently determined for each sub-block, while optimizing the use of the overall bit budget by sharing bits between the sub-blocks through refinement bits.

20 Claims, 13 Drawing Sheets

JOINT MODE DECISION WITH SHARED BIT-BUDGET CONDITION

CROSS-REFERENCE TO RELATED APPLICATIONS

This application claims priority to, and the benefit of, U.S. provisional patent application Ser. No. 61/925,901 filed on Jan. 10, 2014, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This present technology pertains generally to image coding mode decisions, and more particularly to generating joint mode decisions when performing embedded block coding.

2. Background Discussion

Increasingly, image coding systems are moving towards forms of scalable coding, such as resolution-scalable and distortion-scalable. One such system is defined in the JPEG 2000 standard, which uses discrete wavelet transforms (DWT) instead of a discrete cosine transform (DCT). JPEG 2000 has a resolution scalable bit stream.

However, many dependencies are introduced with standard bit-plane coding which has excessive interaction between coding and ordering, that complicate scalability. One mechanism utilized to overcome these dependency issues is to partition the samples into small blocks which are coded independently, this is what is performed by embedded block coding (EBC). There are numerous forms of EBC which exist, such as embedded block coding with optima truncation (EBCOT).

In EBC, each block generates independent bit-streams which are packed into quality layers. Within each quality layer the independent bit streams are subdivided into a large number of "chunks". While preserving the ordering of chunks of a block, the compression system can interleave chunks from the block in a desired manner, each chunk providing incremental contributions to the given quality layer.

However, the independently coded blocks each have a limited bit budget whose use is not always beneficially maximized.

Accordingly, the technology presented is configured for optimizing the use of the bit budget in systems utilizing forms of embedded block coding.

BRIEF SUMMARY

Embedded block coding (EBC) is enhanced utilizing the presented technology by dividing a block, having a fixed bit budget, into two (or more) sub-blocks which share the block bit budget. Partitioning into the sub-blocks is preferably performed in response to a metric of the image, such as color or a spatial consideration. The DPCM/PCM mode and qn value for DPCM are separately determined for each sub-block in a joint mode decision process. The use of bits between the two sub-blocks need not remain equal, as when determining the joint mode decision, that sharing of bits from one sub-block to the other is taken into account. The technology describes multiple embodiments of searching for the best joint mode decision covering the sub-block that remains within the overall bit budget for the block. The mode decision information is then encoded into the bitstream header, while entropy coded bits and refinement bits, and optionally pad bits, are generated to fill the remaining portion of the bitstream which encodes the block.

Further aspects of the present technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The disclosed technology will be more fully understood by reference to the following drawings which are for illustrative purposes only:

DETAILED DESCRIPTION

The present technology provides a joint mode decision (JMD) for a partitioned block, sharing the block's bit-budget when coding image data (e.g., still images, image sequences or frames of video) within an image coding system. Given a single block partitioned to two (or more) sub-blocks, the object is to determine the mode (DPCM or PCM) and quantization number (qn) of each sub-block such that: (1) a fixed bit-budget per block is shared between two sub-blocks, and that (2) the maximum error sample value is minimized. One of ordinary skill the art will appreciate that the present technology can be similarly applied to other color systems, such as CIE models, RGB models, hue plus saturation models (e.g., HSV, HSL), CMYK models, and other luma plus chroma models (e.g., YUV, YIQ, YDbDr, YPbPr, YCbCr, xvYCC, and so forth).

JMD determines the mode for each sub-block: (1) mode (PCM or DPCM); and (2) If DPCM mode is chosen, then a proper qn value is selected.

Two variants of JMD are described, JMD1 and JMD2. In JMD1: (a) a quality conscious joint mode decision (Robust) is performed, and (b) neighbors are searched after the initial independent search of each block. (b) In JMD2: (a) a complexity conscious joint mode decision (Hardware friendly) is performed, and (b) a simple closed-form solution is provided after an initial independent search of each block.

To determine the best mode of a block which has no sub-block partition, four items of information are needed. (1) A bit-budget must be known which depends on the target bps & block size. (2) CoverDPCM must be determined which is the number of DPCM coded bits given a specific qn. (3) CoverRef must be determined which is the number of bits left for refinement for a specific qn. In general, CoverRef=Bit-budget−number of bits used for DPCM coding (≠CoverDPCM). (4) CoverPCM must be determined. CoverPCM=Bit-budget (each bit is PCM coded).

Figure 1:
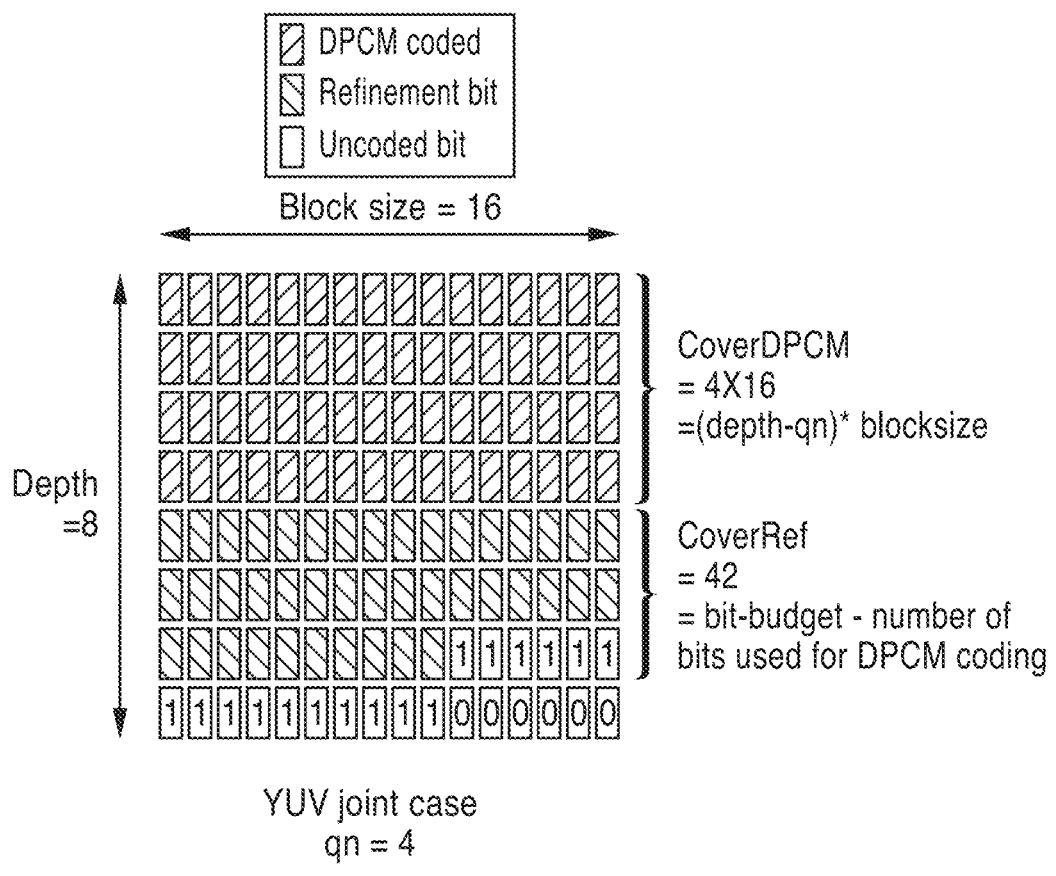
FIG. 1 is a pixel block diagram having a given depth and showing values CoverDPCM and CoverRef exemplified in a YUV joint case (no partitioning) with qn=4.
Figure 2:
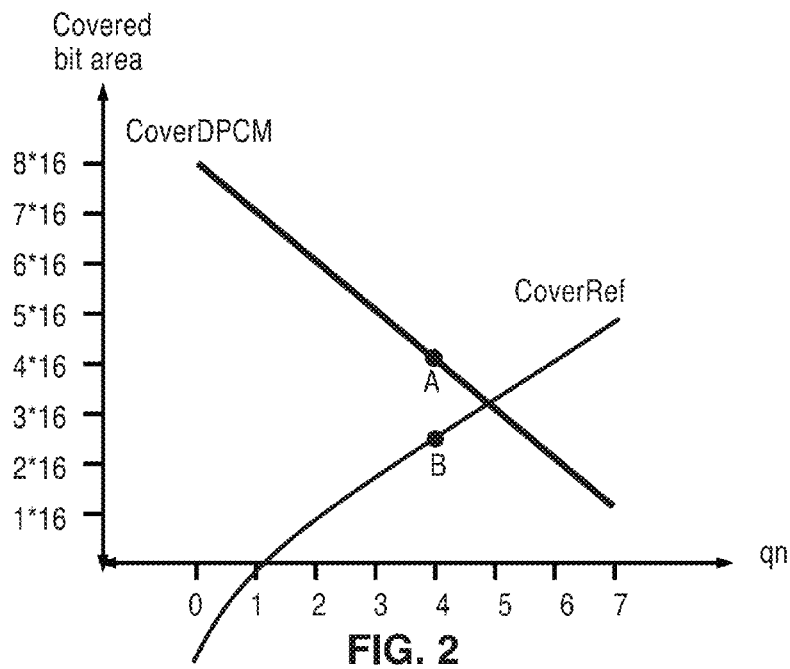
FIG. 2 is a plot of covered bit area with respect to qn showing the relation of CoverDPCM and CoverRef.

FIG. 1 and FIG. 2 illustrate examples of a no partition situation showing block sizes versus depth and the CoverDPCM and CoverRef metrics. In FIG. 1 a YUV joint case coded pixel block is seen with block size of 16 and a depth of 8 (128 total bits). It should be appreciated that this joint case makes a mode decision for the entire block and not separate mode decisions for multiple sub-blocks as described for joint mode decision process (JMD) described later.

In the block of FIG. 1, one sees the DPCM coded bits to a depth of 4, followed by refinement bits for over the next 2 levels, followed by un-coded bits in the last levels, shown coded with 1's and 0's. Thus, for this example, CoverDPCM=64=4 rows×16 pixels/row=(depth-qn)*blocksize; while CoverRef=42=bit-budget−number of bits used for DPCM coding.

FIG. 2 depicts the example with covered bit area on the Y-axis and qn on the X-axis, with plots for CoverDPCM and CoverRef, with points A and B representing these values, respectively, as seen in FIG. 1. It will be seen in the plot that CoverDPCM is fixed and independent of image block data, while CoverRef changes depending on image block data being coded.

One means of evaluating the mode decision (a mode evaluation metric), is by "Coverage". Coverage is the number of covered/coded bits. This particular metric works well since both DPCM and PCM coding is performed from MSB to LSB order:

Coverage=CoverDPCM+CoverRef (DPCM mode)

Coverage=CoverPCM=Bit-budget (PCM mode)

Figure 3:
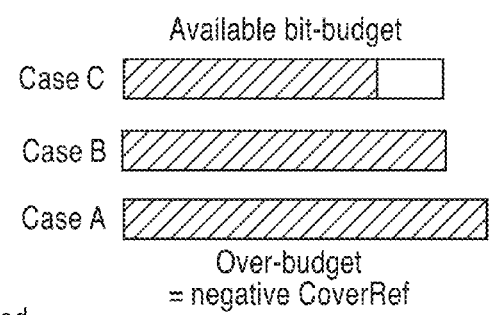
FIG. 3 is a bit-budget diagram showing three coding levels in relation to a given bit budget.

FIG. 3 depicts three cases A, B and C in relation to the available bit budget. In case C the partition is under the available bit budget, while case B uses the entire bit budget, and in case A the number of bits needed exceeds the bit budget for the block. It should be appreciated that CoverRef of chosen qn should be non-negative as seen in case B and case C, but not in case A which is over-budget, and thus has a negative CoverRef value.

Figure 4:
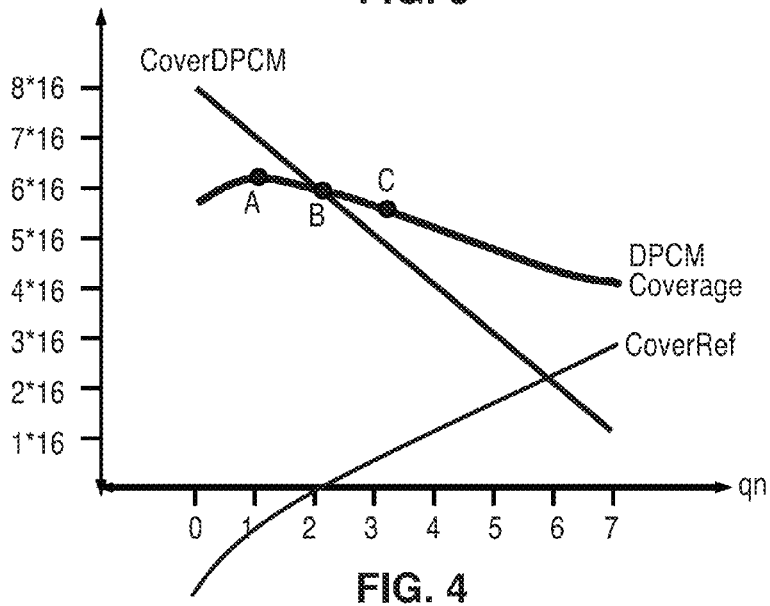
FIG. 4 is a plot of a covered bit area showing the three cases depicted in FIG. 3.

FIG. 4 illustrates the above three cases A, B and C in a graphical form. As in the previous plot, one can see the CoverDPCM as being fixed independent of image data block, while CoverRef changes depending on image data block. By way of example and not limitation, the block in this example is assumed to have a Depth=8, whereby qn is in the range from 0 to 7 (qn=[0:7]). Only one block is considered in this example. Point A (qn=1) provides maximum CoverDPCM+CoverRef. However, CoverRef of A (qn=1) is negative, whereby case A (qn=1) can't be considered. Therefore point B (qn=2) is selected. The Coverage of B is compared with CoverPCM, and a selection made. If Coverage of B exceeds CoverPCM, then DPCM mode is selected with qn=2; otherwise, PCM mode is selected.

In a first joint mode decision embodiment, a fixed joint bit-budget is divided into two blocks (block 1 and block 2) in proportion to their block size. CoverDPCM and CoverRef are determined by the system for each block. CoverDPCM and CoverRef are considered for both blocks jointly, such that (a) joint-coverage is maximized, and (b) CoverRef (block 1)+CoverRef (block 2)≥0. It should be appreciated that Joint-Coverage=Coverage(block 1)+Coverage(block 2)=CoverDPCM(block 1)+CoverDPCM(block 2)+CoverRef (block 1)+CoverRef (block 2). It should also be noted that PCM mode is treated as DPCM with qn=depth, CoverDPCM=0, CoverRef=bit-budget.

Figure 5:
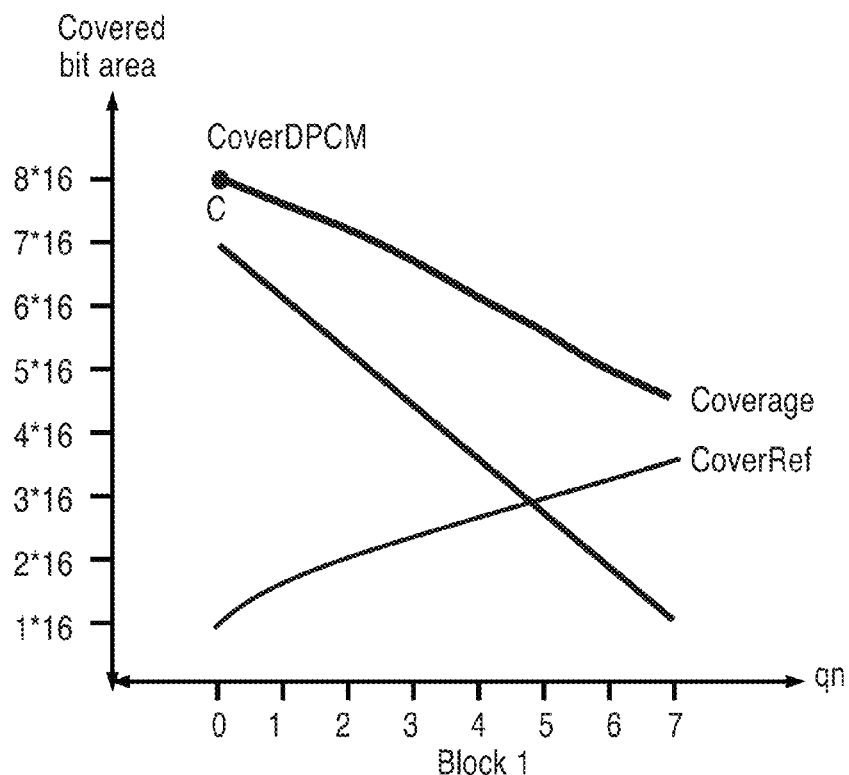
FIG. 5 and FIG. 6 are plots of covered bit area for two different sub-blocks subject to a joint mode decision according to an embodiment of the disclosed technology.
Figure 6:
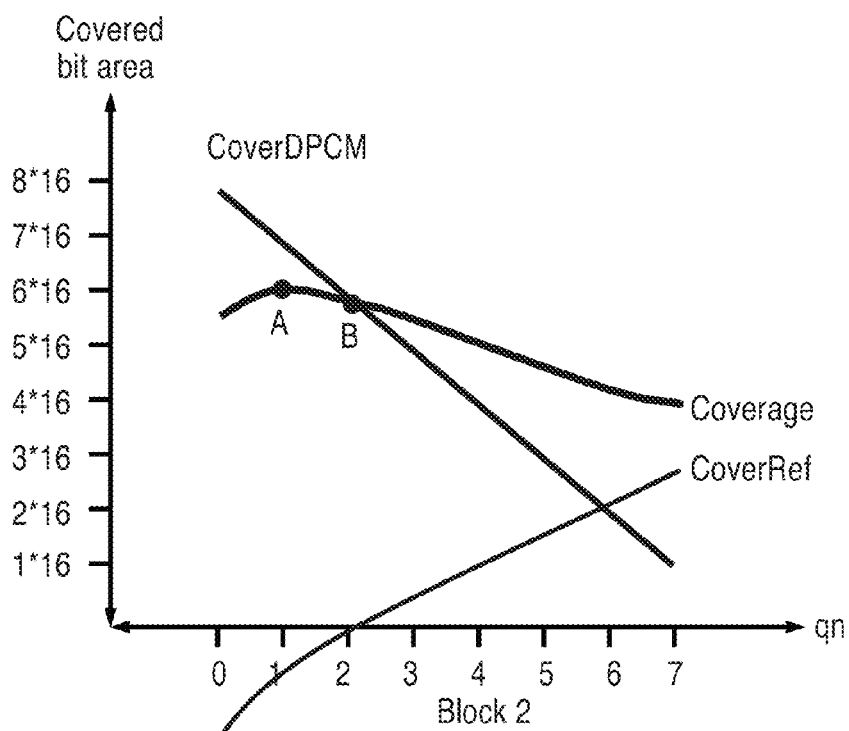

FIG. 5 and FIG. 6 illustrate examples, in which point C (qn=0 for block 1 is chosen in FIG. 5, with point A (qn=1 for block 2) selected in FIG. 6. It will be noted that FIG. 5 and FIG. 6 depict covered bit area (vertical axis) in relation to qn (horizontal axis) for block 1 and block 2, respectively.

The definition utilized above for "joint-coverage" evaluation metric is subject to the following exception.

Figure 7:
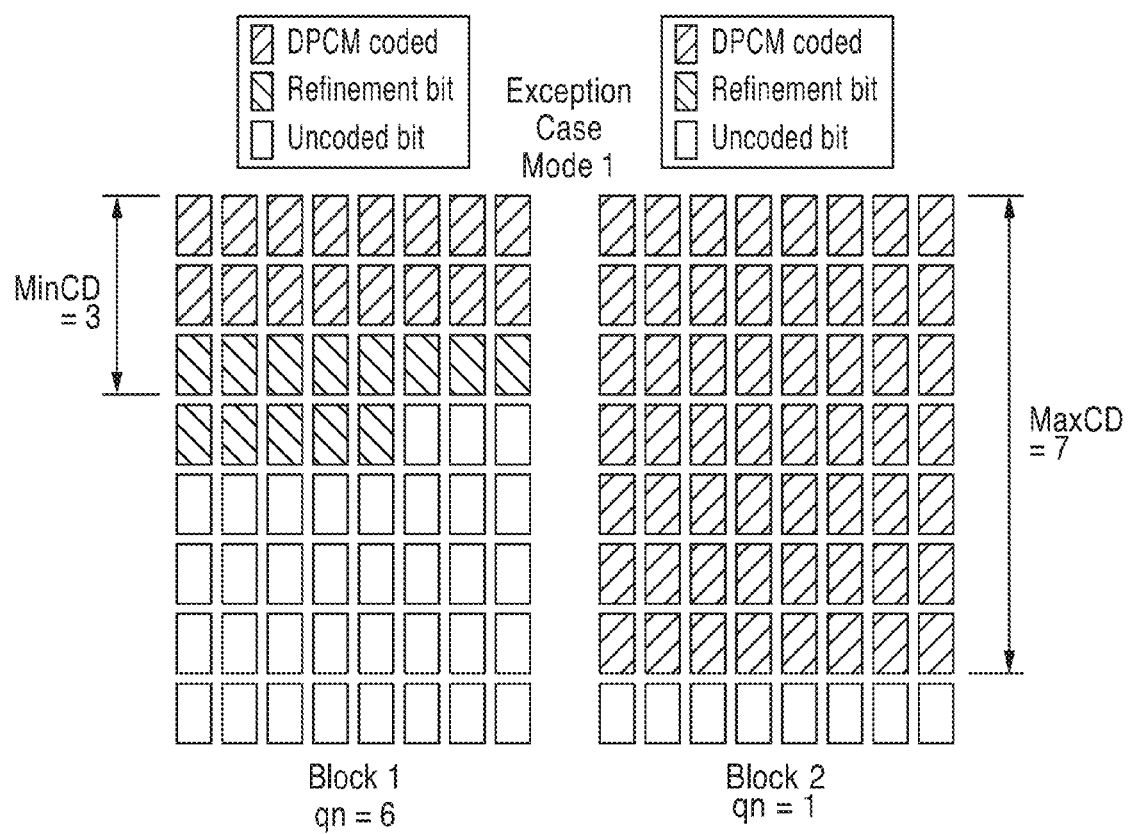
FIG. 7 and FIG. 8 are pixel block diagrams in an example for a first joint mode decision embodiment, and showing an exception and non-exception case as possible mode decisions.
Figure 8:
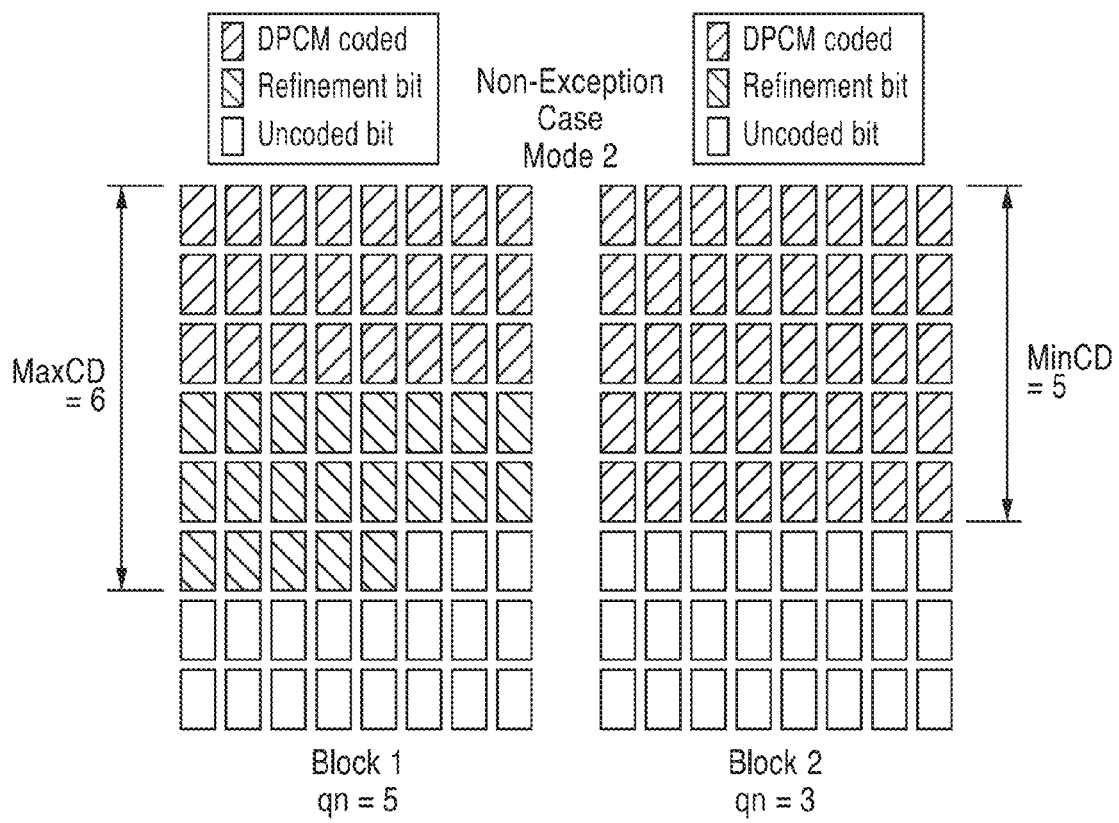

FIG. 7 and FIG. 8 depict example blocks subject to possible mode decision Mode 1 and Mode 2, respectively, chosen because they have the same value of Joint-Coverage. However, the possible mode decision of Mode 2 is clearly preferred to Mode 1 because the maximum error is smaller in Mode 2. In each of these figures, the blocks are shown with a combination of DPCM, refinement, and un-coded bits, for block 1 and block 2 for specific qn values (FIG. 7: qn=6 for block 1, qn=1 for block 2; FIG. 8: qn=5 for block 1, while qn=3 for block 2).

The above exception case is formalized in this section. Refinement bit budget from both sub-blocks (CoverRef (block 1)+CoverRef (block 2)) is allocated to a block with higher qn. It should be appreciated that this refinement allocation allows for checking the "exception case", and is not for the purpose of allocating refinement bits for actual coding.

A determination was made of Max-Covered-Depth (maxCD) and Min-Covered-Depth (minCD). The covered depth consists of the number of covered bits per sample. Note that a depth is considered for minCD only when all bits at that depth are utilized, while a depth is considered for maxCD when ANY bits at that depth are being utilized. The exception case for any sub-block can be determined in one embodiment for sub-blocks in which maxCD−minCD is greater than 1.

Returning to the discussion of FIG. 7 and FIG. 8, it is seen that they are marked for minCD and maxCD for both Mode 1 and Mode 2 decisions. It can be seen that block 1 (qn=6) of Mode 1 has a minCD of 3, while block 2 of Mode 1 has a maxCD of 7. While for Mode 2, block 1 has a maxCD of 6, while block 2 has a minCD of 5. It is readily recognized that Mode 1 is the exception case as maxCD−minCD=4, while for Mode 2 the difference is 1.

In the present disclosure, for the exception case, all covered bits up to the (minCD+1) bit-plane are counted as Joint-Coverage.

Figure 9:
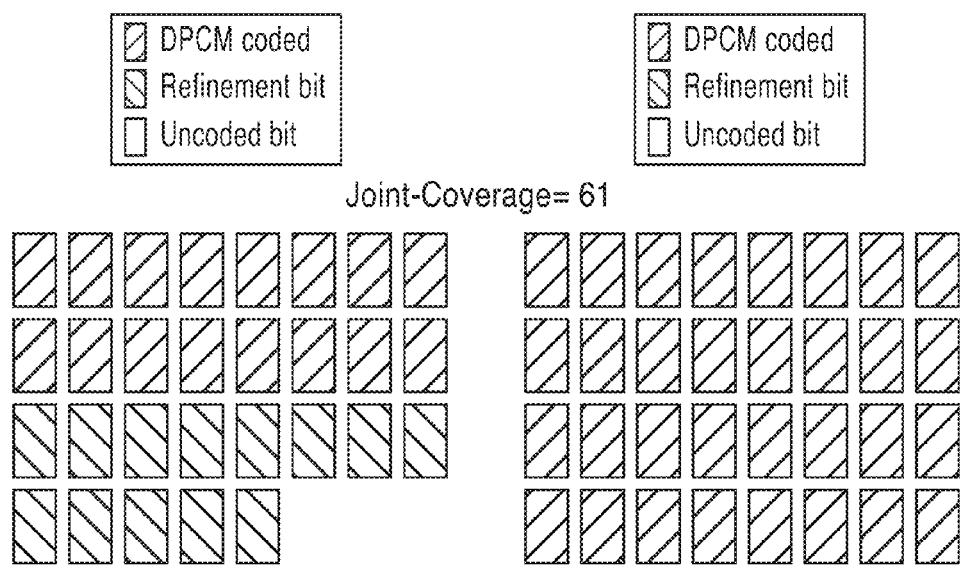
FIG. 9 is a pixel block diagram for the example of FIG. 7 and FIG. 8, showing joint coverage for the exception case.

FIG. 9 depicts counting the covered bits up to minCD+1, from FIG. 7, thus all covered bits in 4 MSBs are counted, yielding a joint coverage value of 61.

Figure 10:
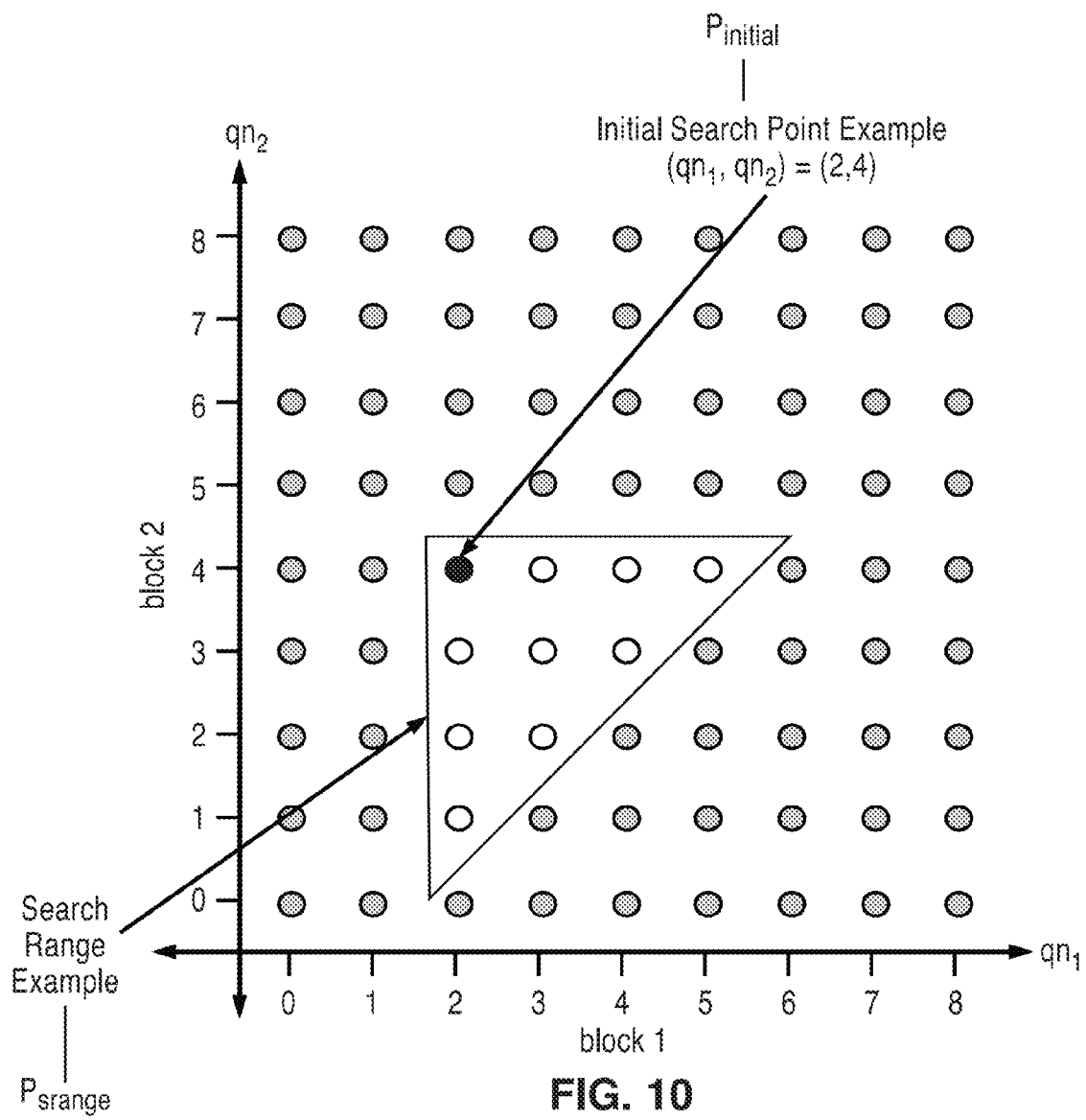
FIG. 10 is a plot of qn search points showing a search range example for an embodiment of the disclosed technology.

FIG. 10 illustrates an example embodiment of a two-dimensional (2D) search process for this first embodiment of performing a joint mode decision. In the figure, qn is shown for block 1 (horizontal) and block 2 (vertical). The optimization problem in 2D is to maximize joint-coverage (gn1, qn2). It will be appreciated that a total of 9×9=81 checking points exist for a depth of 8. The range value is 9 because there are 8 choices for DPCM (qn ∈ {0-7}) and 1 for PCM (qn=8).

Step 1: an initial search point is determined, $P_{initial}$, exemplified here with $(qn_1, qn_2)=(2, 4)$. A determination is made for each block to independently find its best qn value, as previously described. Then the fixed joint bit-budget is divided into two blocks in proportion to their block size to arrive at this initial search point $P_{initial}$.

Step 2: Based on the initial search point initial ($P_{initial}$), the search range is increased ($P_{srange}$). The basic rule is that the sub-block with lower initial qn (e.g., block 1) can increase its qn, such that more refinement bits can be borrowed from the other sub-block with higher initial qn (e.g., block 2). It will be recognized that this process leads to increased bit-budget for block 2, which may allow qn of block 2 to be reduced. This is described in more detail in the following section.

Step 3: Joint-Coverage is determined for the points in the search range ($P_{srange}$), seen as the triangular area in FIG. 10, and one point is selected as having maximum Joint-Coverage.

Figure 11:
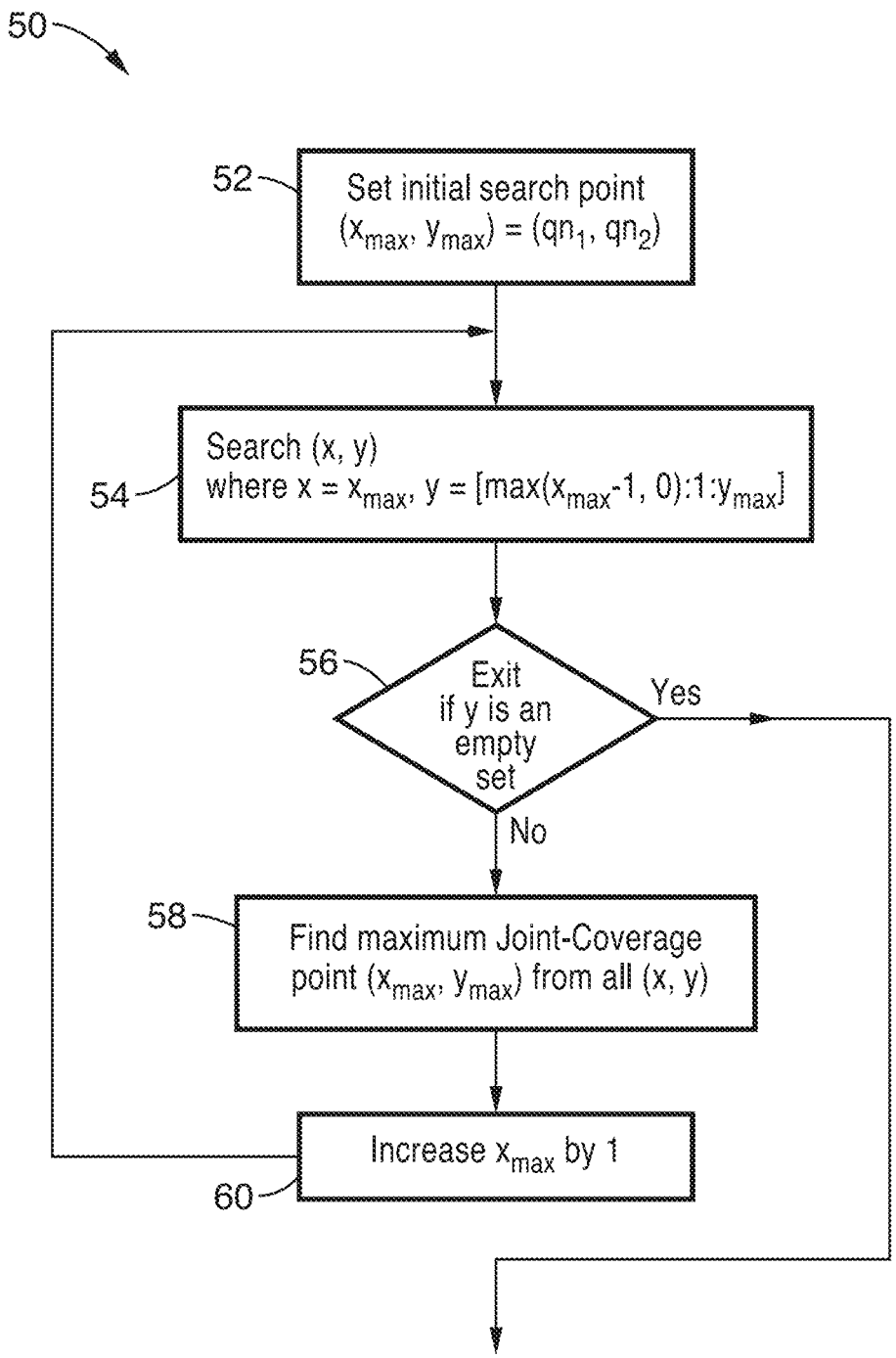
FIG. 11 is a flow diagram of searching for a joint mode decision that maximizes joint coverage according to an embodiment of the disclosed technology.

FIG. 11 illustrates an example embodiment 50 of pseudo-code for implementing the search process. In this process it is assumed that $qn_1$ is less than or equal to $qn_2$. In block 52, an initial search point is set or selected $(x_{max}, y_{max})=(qn_1, qn_2)$. Then (x, y) is searched 54, where $x=x_{max}$, $y=[\max(x_{max}-1, 0):1:y_{max}]$. A check is made 56 to determine if y is an empty set, and if true, then the search is exited, with execution shown jumping past the block 60. Otherwise, maximum Joint-Coverage is found 58 point $(x_{max}, y_{max})$ from all (x, y) in step 1. Finally, $x_{max}$ is increased 60 by 1 and a return made to block 54 to continue the search.

Figure 12:
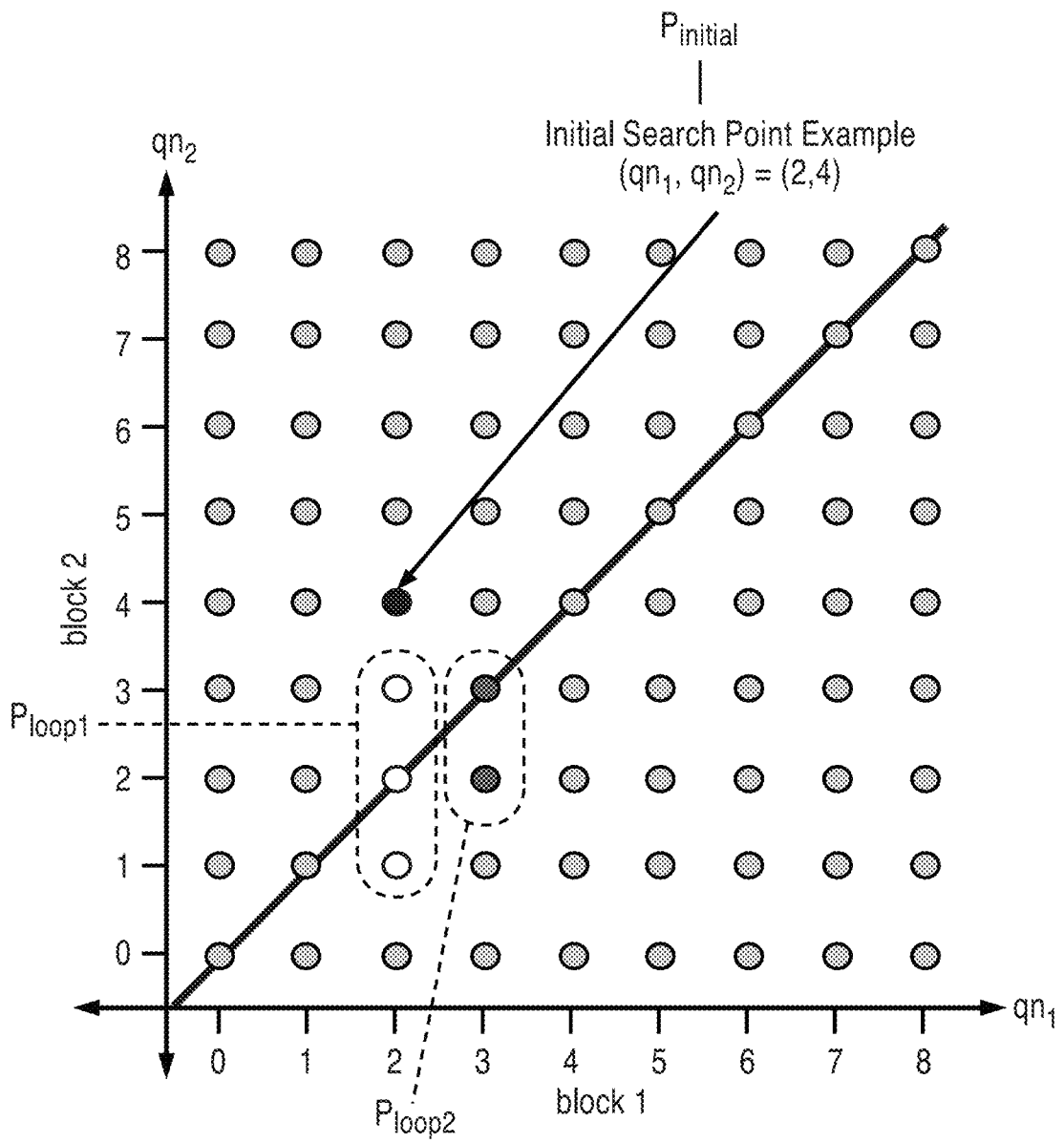
FIG. 12 is a plot of a first example qn search performed according to FIG. 11 through three loops.

FIG. 12 depicts an example of the search process according to FIG. 11, again showing qn for block 2 on the vertical axis, and qn for block 1 on the horizontal, and a diagonal line of equal qn. The initial search point $P_{initial}$ is set, seen here as point (2, 4). During the first loop, dots $P_{loop1}$, seen as points (2,1), (2,2) and (2,3) are checked in the search. A second loop is performed, and if point (2,3) is maximum of first loop, then the search results in the second loop dots $P_{loop2}$. A third loop is performed, and if joint coverage at point (3, 2) exceeds that at point (3,3), then an exit is performed with an empty search set.

Figure 13:
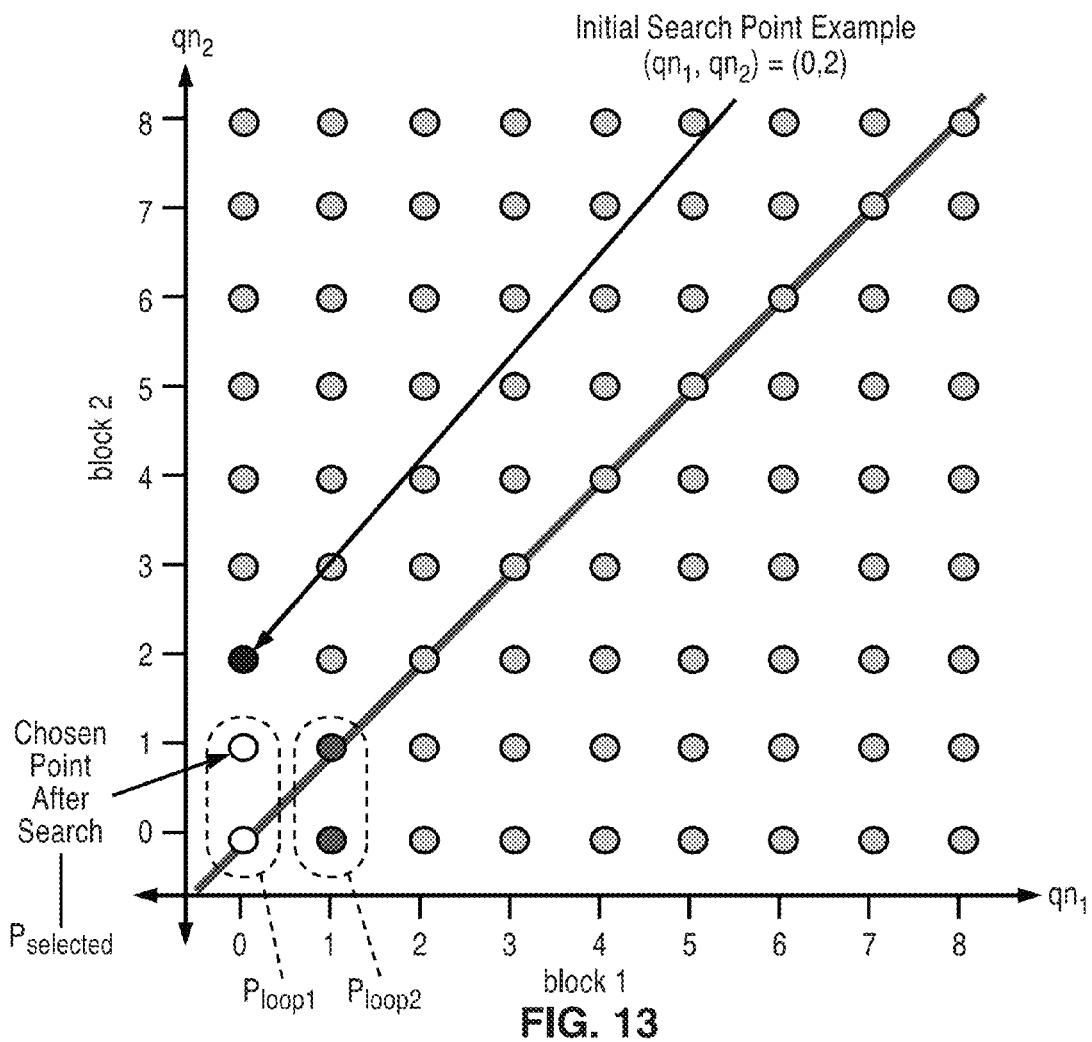
FIG. 13 is a plot of a second example qn search performed according to FIG. 11.

FIG. 13 depicts a second example of this first JMD search process. It will be noted that for this example, the curves for CoverDPCM, CoverRef and coverage are as previously depicted in FIG. 5 and FIG. 6. The initial search point, $P_{initial}$, is set (e.g., point (0, 2)), and in a first loop, $P_{loop1}$ points are searched, while in a second loop, $P_{loop2}$ points are searched. Point $P_{selected}$ is chosen in the search for maximizing joint coverage.

It should be appreciated that the pseudo code of FIG. 11 is shown by way of example, while one of ordinary skill in the art will recognize that other processing may be utilized for performing this search. The following example embodiment for joint mode decisions is perhaps simpler and more amenable to the hardware.

Figure 14:
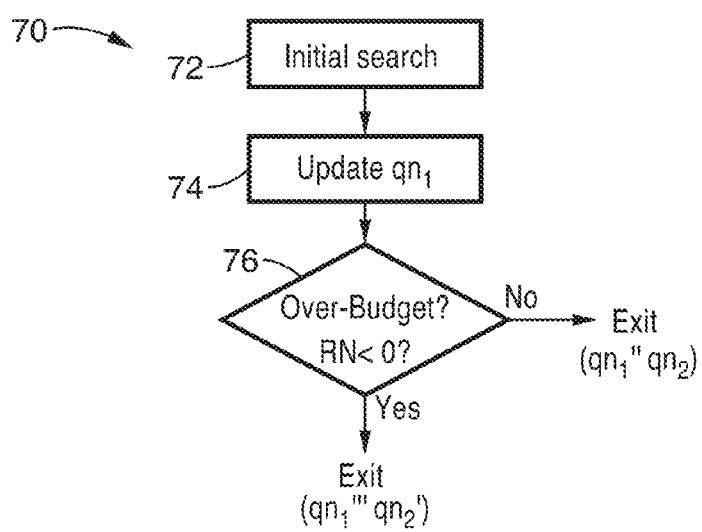
FIG. 14 is a flow diagram of a second embodiment of joint mode decision.

FIG. 14 illustrates another example embodiment 70 of performing a joint mode decision. It will be noted that Coverage=CoverDPCM+CoverRef. Value θ represents find (CoverRef≥0), and having a first index that has positive value. A Covered Bit-plane Number (CBN)=floor((CoverRef(block1)+CoverRef(block2))/block Size $(qn_2)$) while assuming that $qn_1$ is less than $qn_2$.

In step 72 a block independent search is performed, with a fixed joint bit-budget divided into two blocks in proportion to their block size:

$(qn_1'\ qn_2')$: max(Coverage) with bit-budget constraint (qn=θ, . . . , depth);

$(qn_1\ qn_2)$: max(Coverage) without bit-budget constraint, (qn=0, . . . , depth).

In step 74, $qn_1$ is updated, while assuming $qn_1<qn_2$. Thus, $qn_1$ is increased to have more refinement bits to be borrowed by the $qn_2$ block:

$$qn_1''=qn_1+(\max(abs(qn_1-qn_2)-CBN, 0))<<1$$

$$qn_1'''=qn_1'+(\max(abs(qn_1'-qn_2')-CBN', 0))<<1$$

In step 76 a determination is made if the updated value is over-budget, RN<0. If it is not over budget, then an exit is made with values $(qn_1'', qn_2)$, otherwise, if it is over budget, then an exit is performed with values $(qn_1''', qn_2')$.

It should be appreciated that in step 72, two searches can be implemented together as one. The actual complexity of two searches is similar to just one search complexity. The equation example for step 74 of the process may be optimized further. Based on simulation results, this JMD2 process provides similar performance as JMD1 with significantly less computational complexity.

The following section describes how the disclosed technology is utilized in current EBC codec, which is exemplified by, but not limited to, using YUV 422 data.

The mode decision process determines block partition, coding with either DPCM or PCM, and the value for qn.

Figure 15:
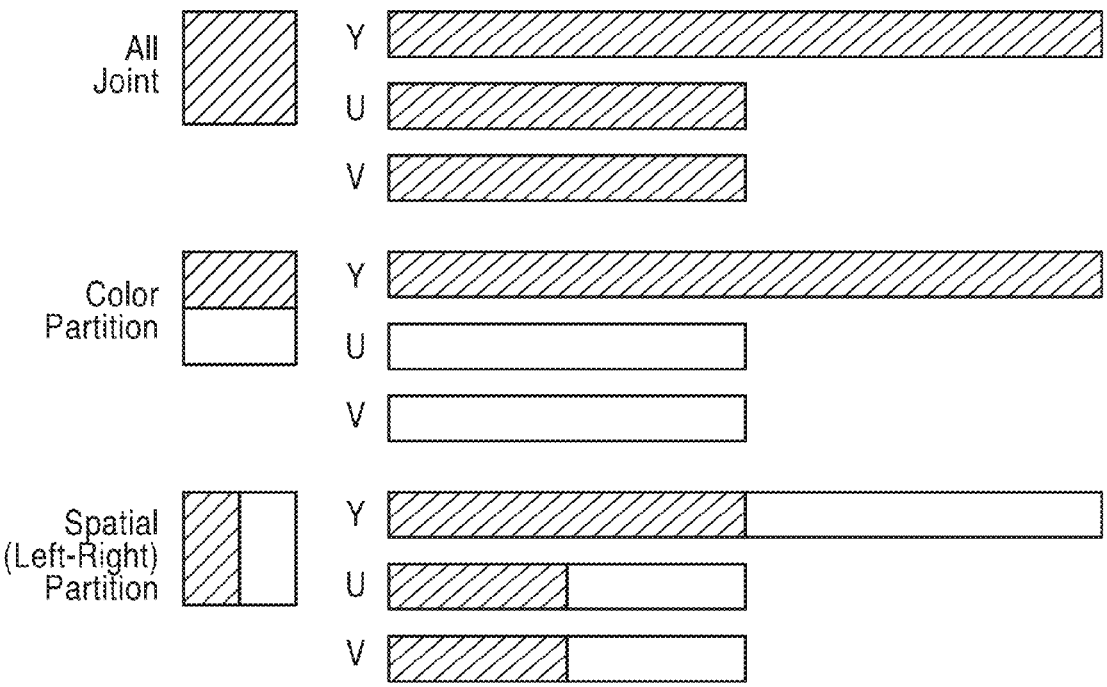
FIG. 15 is a diagram of 1D blocks shown with three different forms of partitioning used for joint mode decisions in an EBC codec according to an embodiment of the disclosed technology.

FIG. 15 depicts using three types of partitions for a YUV 422 block, these are shown as all joint with YUV all jointly coded, a color partition with a separate Y coding and joint UV coding, and spatial left-right partition with a left sub-block separately coded from the right sub-block. Regarding the block partition, one of the options shown in FIG. 15 are selected.

Figure 16:
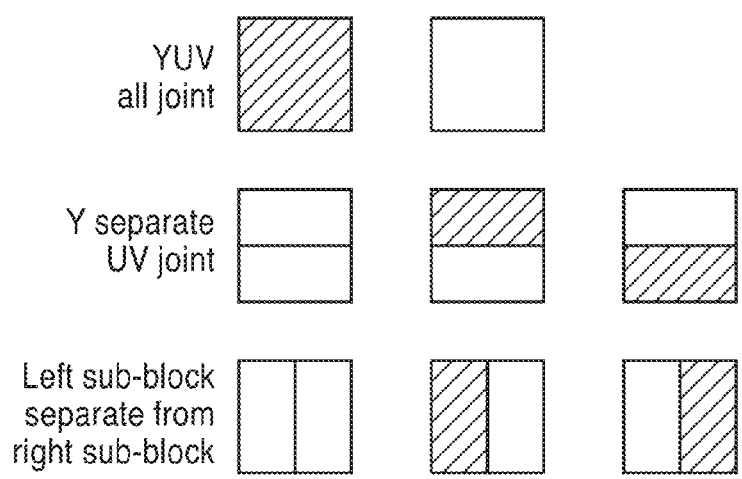
FIG. 16 is a diagram of mode selections (DPCM/PCM) showing eight possible modes used for joint mode decisions according to an embodiment of the disclosed technology.

FIG. 16 depicts the eight possible modes for the DPCM/PCM decision. The DPCM/PCM decision determines whether to use DPCM or PCM mode for each sub-block, whereby there are eight possible modes. Two cases for YUV all joint are seen with either DPCM or alternatively PCM selected. Three cases are shown with Y separately selecting DPCM/PCM from UV for which a joint DPCM/PCM decision is made. Finally, three cases are shown with the DPCM/PCM decision being made separately for the left sub-block than for the right sub-block.

The qn selection decision is performed for each DPCM coded sub-block, whereby the qn value is selected from between 0 and depth-1.

Figure 17:
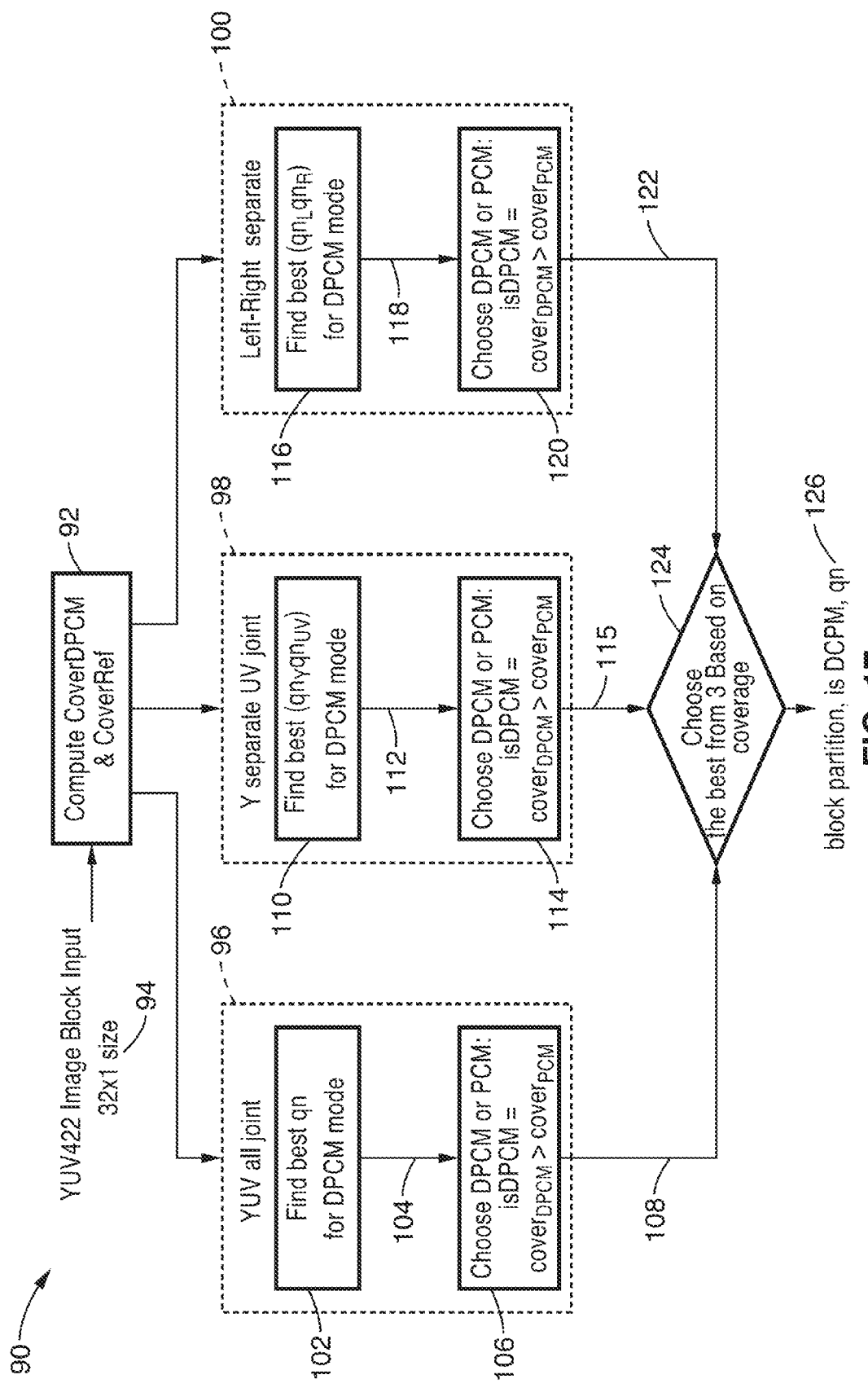
FIG. 17 is a flow diagram showing a joint mode decision selection according to an embodiment of the disclosed technology.

FIG. 17 illustrates a joint mode decision diagram 90 showing existing fixed YUV mode decisions at the left with the addition of additional mode decisions to its right in forming a joint mode decision. In this example a YUV 422 image block (32×1) input 94 is received to compute 92 CoverDPCM and CoverRef where Cover=CoverDPCM+CoverRef.

At the left side of the figure a YUV all joint decision 96 is made, with finding best qn for DPCM mode 102, so qn and coverDPCM 104 are determined, then choosing 106 DPCM or PCM where isDPCM=$cover_{DPCM}$>$cover_{PCM}$. Output 108 provides $isDPCM_{joint}$, $qn_{joint}$, and $cover_{joint}$ for receipt at block 124 choosing the best from the three mode decisions (96, 98, 100, based on coverage, and outputting 126 block partition, isDPCM and qn.

The center section of the figure illustrates a mode decision 98 with Y separate from UV joint. In this step, a best $qn_Y qn_{UV}$ are found 110 for DPCM mode, with output 112 $qn_Y qn_{UV}$ and $cover_{DPCM}$. Then choosing 114 DPCM or PCM based on isDPCM=$cover_{DPCM}$>$cover_{PCM}$, to output 115 $isDPCM_Y$ is $DPCM_{UV}$, $qn_Y qn_{UV}$, $cover_{Y\text{-}UV}$ to block 124 to select the best from the three based on coverage and outputting 126 block partition, isDPCM and qn.

The right portion of the figure illustrates the mode decision 100 with left-right separately decided. In this a best $qn_L qn_R$ is found 116 for DPCM mode, with output 118 $qn_L qn_R$ and $cover_{DPCM}$. Then choosing 120 DPCM or PCM based on isDPCM=$cover_{DPCM}$>$cover_{PCM}$, to output 122 $isDPCM_L$ is $DPCM_R$, $qn_L qn_R$, $cover_{L\text{-}R}$ to block 124 to select the best from the three based on coverage and outputting 126 block partition, isDPCM and qn.

It should be appreciated in regard to FIG. 17 that mode decisions have been enhanced by performing a joint mode decision which includes checking for Y separate from UV, and Right separated from Left. Thus, the three best candidates from YUV joint, Y separate from UV, and left separated from right are candidates for the final mode decision based on choosing maximum joint-coverage from these three mode decisions.

Figure 18:
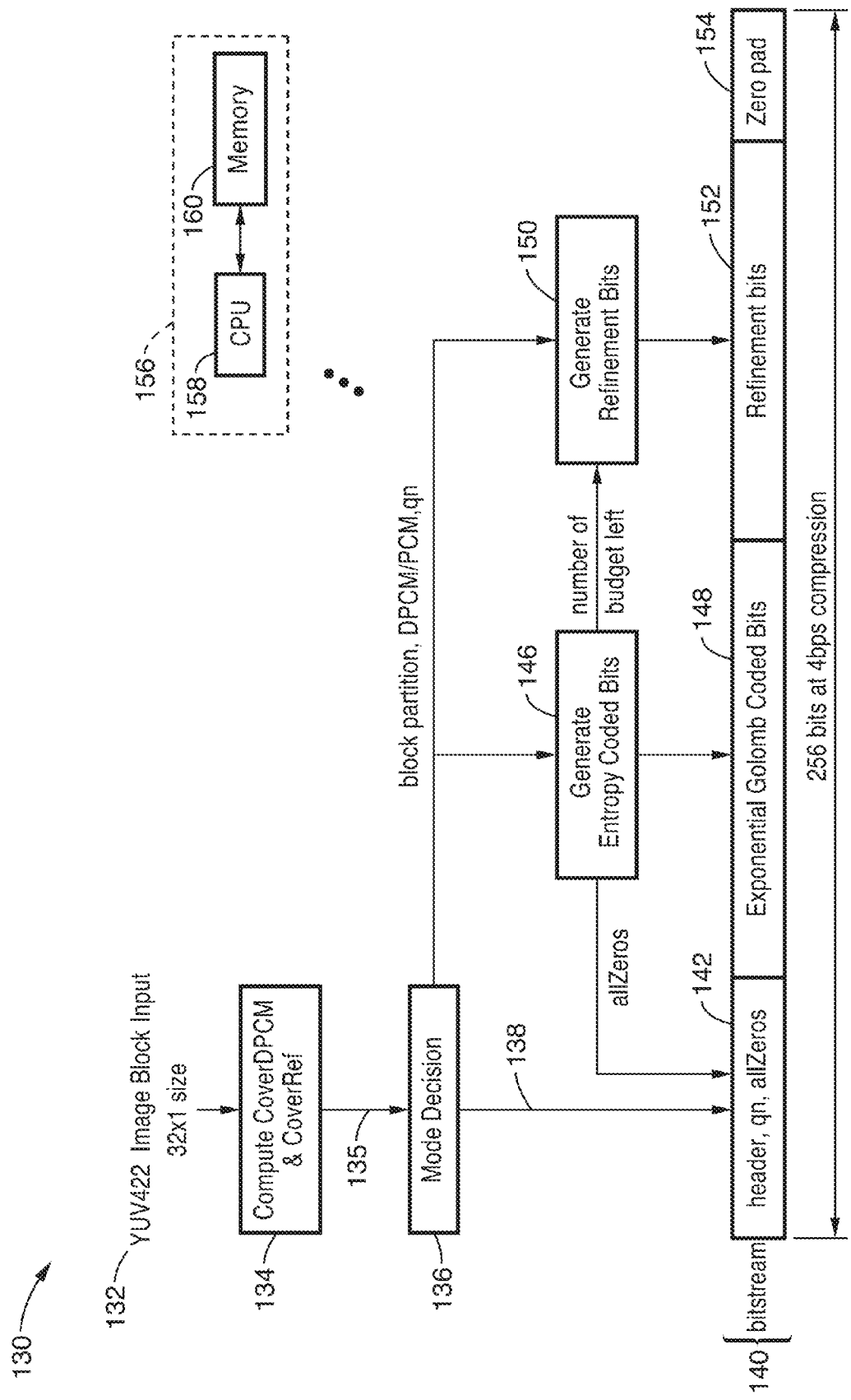
FIG. 18 is a flow diagram for an encoder according to an embodiment of the disclosed technology.

FIG. 18 is an example embodiment 130 of an encoder. By way of example and not limitation, the encoder receives a YUV422 image block input 132 (e.g., 32×1) from which it determines 134 CoverDPCM and CoverREF, which are output 135 to a mode decision block 136 which outputs 138 block partition, DPCM/PCM selection, and qn into the header 142 of bitstream 140. It will be seen that this bitstream is exemplified as comprising sections 142 as a header, 148 as exponential Golomb coded bits, 152 refinement bits, and zero padding 154. Block partition, DPCM/PCM, and qn information are received at block 146 for generating entropy coded bits. It will be seen that if these are all zeroes, then the allZeroes flag is set in header 142. Entropy coded bits are exponential Golomb coded 148 into bitstream 140, while the number of bits remaining in the bit budget is communicated to processing block 150. Processing block 150 receives the block partition, DPCM/PCM, and qn information, as well as the number of remaining bits and outputs the refinement bits 152 within bitstream 140. Zero padding 154 is utilized if bit-budget remains after coding all bits. The size this block is exemplified as being 256 bits at a 4 bps compression.

Figure 19:
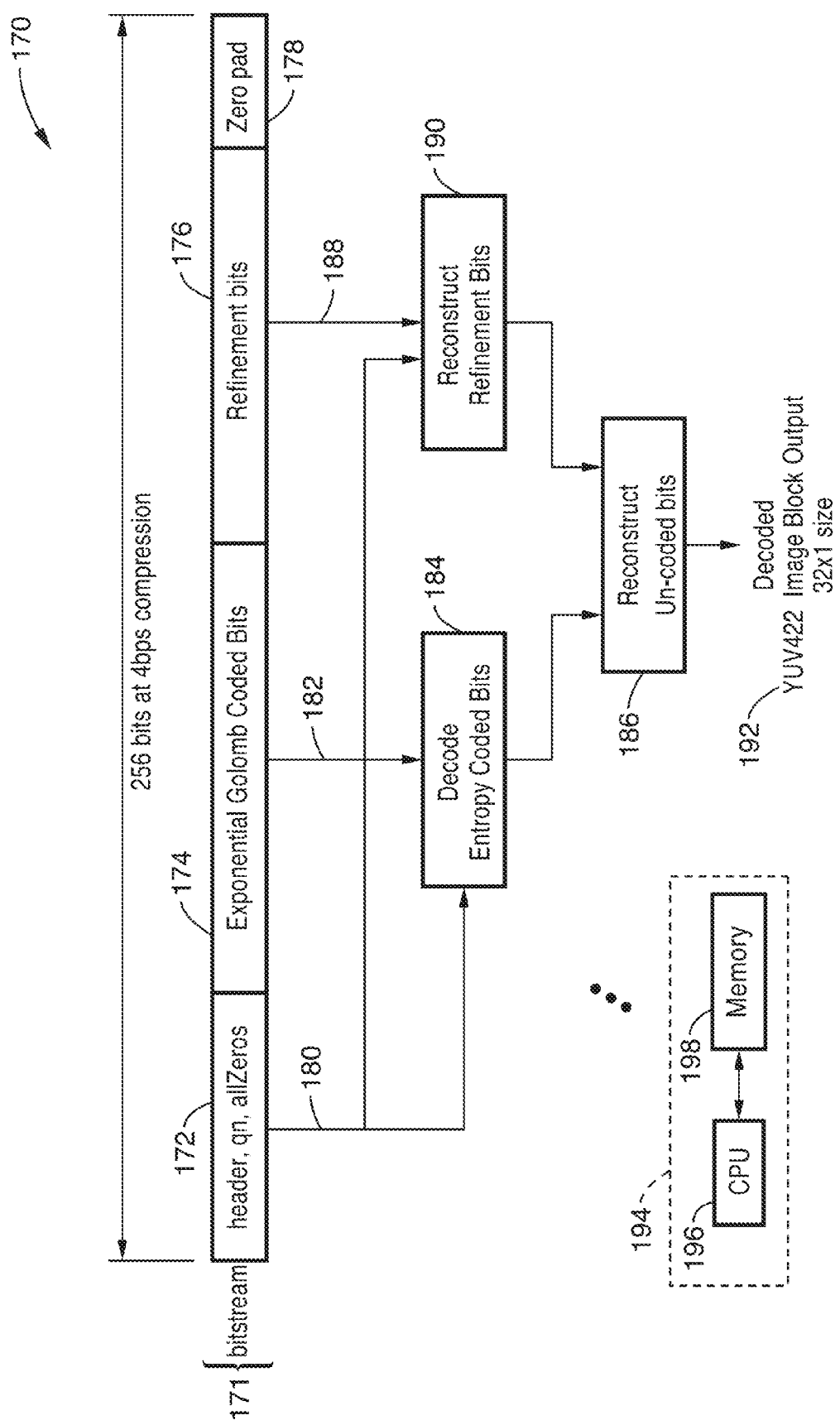
FIG. 19 is a flow diagram for a decoder according to an embodiment of the disclosed technology.

FIG. 19 is an example embodiment 170 of a decoder which operates on bitstream 171 having a block exemplified in FIG. 18 as being 256 bits at a 4 bps compression. The bitstream comprises sections 172 as a header, 174 as an exponential Golomb coded bits, 176 refinement bits, and zero padding 178. The decoding process generally works in the opposite manner to perform the inverse of the encoding. The header is decoded as to the block partition, DPCM/PMC, qn and allZeros flag 180. This information 180 is received by a block 184 for decoding entropy bits 182 received from bitstream exponential Golomb coded bits 174. Refinement bits 176 are received 188 by a refinement bit reconstruction processing block 190, which also receives the information from the decoded header 180. Output from decoding the entropy coded bits 184 and reconstructing refinement bits 190 are received for reconstructing un-coded bits 186, from which is output 192 decoded YUV 422 image block output (e.g., 32×1 size).

It should be appreciated that the encoder (e.g., FIG. 18) and decoder (e.g., FIG. 19) are preferably embodied as programming executing from a computing element 156, 194, comprising at least one processor 158, 196, and at least one associated memory device 160, 198, from which programming may be retrieved for execution on the processor device(s). It will be appreciated that memory may comprise solid state memory, computer-readable media, other media for retaining programming that is executable on the computer processor. The present technology is non-limiting with regard to memory and computer-readable media, insofar as these are non-transitory, and thus not constituting a transitory electronic signal.

Embodiments of the present technology may be described with reference to flowchart illustrations of methods and systems according to embodiments of the technology, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. An apparatus for coding image data using embedded block coding, comprising: (a) a computer processor; and (b) programming in a non-transitory computer readable medium and executable on the computer processor for performing steps comprising: (b)(i) coding image data independently for each block within a predetermined bit budget; (b)(ii) partitioning each said block into multiple sub-blocks which share said predetermined bit budget; (b)(iii) performing a joint mode decision for each said sub-block in which it is determined whether to code with differential pulse code modulation (DPCM) or pulse code modulation (PCM), and with a quantization number being determined for each sub-block having any DPCM coded pixels, and making the joint mode decision taking into account optimizing coding by using bit sharing between the sub-blocks; (b)(iv) wherein DPCM coding requires fewer coding bits than PCM coding, and higher quantization levels of DPCM require fewer coding bits than lower quantization levels; (b)(v) wherein an overall bit budget for the block, as a block level bit budget, is divided equally amongst the sub-blocks as a sub-block budget, with remaining bits from the sub-block budget being shared as refinement bits from one sub-block to another; (b)(vi) wherein said joint mode decisions are performed so that any remaining bits from one refinement bits are shared between sub-blocks to optimize coding; (b)(vii) encoding mode decision and qn within a header of a bitstream output; (b)(viii) generating entropy coded bits into the bitstream for each sub-block based on said joint mode decision; and (b)(ix) generating refinement bits based on information from the joint mode decision in combination with information on how many bits remain in the bit budget when generating entropy coded bits.

2. The apparatus of any preceding embodiment, wherein said programming is configured to separate blocks into sub-blocks in response to color partitioning.

3. The apparatus of any preceding embodiment, wherein said programming is configured to separate blocks into sub-blocks in response to spatial partitioning.

4. The apparatus of any preceding embodiment, wherein said programming is configured to determine if an exception case of the mode decision exists and make an alternative mode decision.

5. The apparatus of any preceding embodiment, wherein the exception case arises when maximum covered depth in either of the sub-blocks differs from minimum covered depth in either of the sub-blocks by at least one.

6. The apparatus of any preceding embodiment, wherein covered depth is determined by the number of covered bits per sample.

7. The apparatus of any preceding embodiment, wherein said programming is configured to perform said joint mode decision in response to a search process for maximizing joint coverage over a number of dimensions equal to the number of sub-blocks into which each block is divided.

8. The apparatus of any preceding embodiment, wherein each dimension of said search process has a range of choices that includes one choice for PCM and one choice for each available qn value when DPCM coding.

9. The apparatus of any preceding embodiment, wherein said programming is configured to use a two dimensional search process when making a joint mode decision when each block is divided into two sub-blocks.

10. An apparatus for coding image data using embedded block coding, comprising: (a) a computer processor; and (b) programming in a non-transitory computer readable medium and executable on the computer processor for performing steps comprising: (b)(i) coding image data independently for each block within a predetermined bit budget; (b)(ii) partitioning, based on color or spatial considerations, each said block into multiple sub-blocks which share said predetermined bit budget; (b)(iii) performing a joint mode decision for each said sub-block in which it is determined whether to code with differential pulse code modulation (DPCM) or pulse code modulation (PCM), and with a quantization number being determined for each sub-block having any DPCM coded pixels, and making the joint mode decision taking into account optimizing coding by using bit sharing between the sub-blocks; (b)(iv) determining if this is an exception case of the mode decision and making an alternative mode decision; (b)(v) wherein DPCM coding requires fewer coding bits than PCM coding, and higher quantization levels of DPCM require fewer coding bits than lower quantization levels; (b)(vi) wherein an overall bit budget for the block, as a block level bit budget, is divided equally amongst the sub-blocks as a sub-block budget, with remaining bits from the sub-block budget being shared as refinement bits from one sub-block to another; (b)(vii) wherein said joint mode decisions are made so that any remaining bits from one refinement bits are shared between sub-blocks to optimize coding; (b)(viii) encoding mode decision and qn within a header of a bitstream output; (b)(ix) generating entropy coded bits into the bitstream for each sub-block based on said joint mode decision; and (b)(x) generating refinement bits based on information from the joint mode decision in combination with information on the number of bits left when generating entropy coded bits.

11. The apparatus of any preceding embodiment, wherein said exception case arises when maximum covered depth in either of the sub-blocks differs from minimum covered depth in either of the sub-blocks by at least one.

12. The apparatus of any preceding embodiment, wherein covered depth is determined by the number of covered bits per sample.

13. The apparatus of any preceding embodiment, wherein said programming is configured to perform said joint mode decision in response to a search process for maximizing joint coverage over a number of dimensions equal to the number of sub-blocks into which each block is divided;

14. The apparatus of any preceding embodiment, wherein each dimension of said search process has a range of choices that includes one choice for PCM and one choice for each available qn value when DPCM coding.

15. The apparatus of any preceding embodiment, wherein said programming is configured to use a two dimensional search process when making a joint mode decision when each block is divided into two sub-blocks.

16. A method of coding image data using embedded block coding, comprising: (a) coding image data independently for each block within a predetermined bit budget, during image data coding on a computer processor with associated non-transitory computer readable medium configured for processing image data; (b) partitioning each said block into multiple sub-blocks which share said predetermined bit budget; (c) performing a joint mode decision for each said sub-block in which it is determined whether to code with differential pulse code modulation (DPCM) or pulse code modulation (PCM), and with a quantization number being determined for each sub-block having any DPCM coded pixels, and making the joint mode decision taking into account optimizing coding by using bit sharing between the sub-blocks; (d) wherein DPCM coding requires fewer coding bits than PCM coding, and higher quantization levels of DPCM require fewer coding bits than lower quantization levels; (e) dividing an overall bit budget for the block, as a block level bit budget, equally amongst the sub-blocks as a sub-block budget, and sharing remaining bits from the sub-block budget as refinement bits from one sub-block to another; (f) wherein said joint mode decisions are performed so that any remaining bits from one sub-block are shared as refinement bits with other sub-blocks to optimize coding; (g) encoding mode decision and qn within a header of a bitstream output; (h) generating entropy coded bits into the bitstream for each sub-block based on said joint mode decision; and (i) generating refinement bits based on information from the joint mode decision in combination with information on the number of bits left when generating entropy coded bits.

17. The method of any preceding embodiment, wherein said separating blocks into sub-blocks is performed in response to color partitioning, or spatial partitioning.

18. The method of any preceding embodiment, further comprising determining an exception case of said mode decision and making an alternative mode decision.

19. The method of any preceding embodiment: wherein the exception case arises when maximum covered depth in either of the sub-blocks differs from minimum covered depth in either of the sub-blocks by at least one; and wherein covered depth is determined by the number of covered bits per sample.

20. The method of any preceding embodiment: wherein said joint mode decision is performed in response to a search process for maximizing joint coverage over a number of dimensions equal to the number of sub-blocks into which each block is divided; and wherein each dimension of said search process has a range of choices that includes one choice for PCM and one choice for each available qn value when DPCM coding.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for coding image data using embedded block coding, comprising:
   (a) a computer processor; and
   (b) programming in a non-transitory computer readable medium and executable on the computer processor for performing steps comprising:
      (i) coding image data independently for each block within a predetermined bit budget;
      (ii) partitioning each said block into multiple sub-blocks which share said predetermined bit budget;
      (iii) performing a joint mode decision for each said sub-block in which it is determined whether to code with differential pulse code modulation (DPCM) or pulse code modulation (PCM), and with a quantization number being determined for each sub-block having any DPCM coded pixels, and making the joint mode decision taking into account optimizing coding by using bit sharing between the sub-blocks;
      (iv) wherein DPCM coding requires fewer coding bits than PCM coding, and higher quantization levels of DPCM require fewer coding bits than lower quantization levels;
      (v) wherein an overall bit budget for the block, as a block level bit budget, is divided equally amongst the sub-blocks as a sub-block budget, with remaining bits from the sub-block budget being shared as refinement bits from one sub-block to another;
      (vi) wherein said joint mode decisions are performed so that any remaining bits from one refinement bits are shared between sub-blocks to optimize coding;
      (vii) encoding mode decision and quantization number (qn) within a header of a bitstream output;
      (viii) generating entropy coded bits into the bitstream for each sub-block based on said joint mode decision; and
      (ix) generating refinement bits based on information from the joint mode decision in combination with information on how many bits remain in the bit budget when generating entropy coded bits.

2. The apparatus recited in claim 1, wherein said programming is configured to separate blocks into sub-blocks in response to color partitioning.

3. The apparatus recited in claim 1, wherein said programming is configured to separate blocks into sub-blocks in response to spatial partitioning.

4. The apparatus recited in claim 1, wherein said programming is configured to determine if an exception case of the mode decision exists and make an alternative mode decision.

5. The apparatus recited in claim 4, wherein the exception case arises when maximum covered depth in either of the sub-blocks differs from minimum covered depth in either of the sub-blocks by at least one.

6. The apparatus recited in claim 5, wherein covered depth is determined by the number of covered bits per sample.

7. The apparatus recited in claim 1, wherein said programming is configured to perform said joint mode decision in response to a search process for maximizing joint coverage over a number of dimensions equal to the number of sub-blocks into which each block is divided.

8. The apparatus recited in claim 7, wherein each dimension of said search process has a range of choices that includes one choice for PCM and one choice for each available qn value when DPCM coding.

9. The apparatus recited in claim 7, wherein said programming is configured to use a two dimensional search process when making a joint mode decision when each block is divided into two sub-blocks.

10. An apparatus for coding image data using embedded block coding, comprising:
    (a) a computer processor; and
    (b) programming in a non-transitory computer readable medium and executable on the computer processor for performing steps comprising:
        (i) coding image data independently for each block within a predetermined bit budget;
        (ii) partitioning, based on color or spatial considerations, each said block into multiple sub-blocks which share said predetermined bit budget;
        (iii) performing a joint mode decision for each said sub-block in which it is determined whether to code with differential pulse code modulation (DPCM) or pulse code modulation (PCM), and with a quantization number being determined for each sub-block having any DPCM coded pixels, and making the joint mode decision taking into account optimizing coding by using bit sharing between the sub-blocks;
        (iv) determining if this is an exception case of the mode decision and making an alternative mode decision;
        (v) wherein DPCM coding requires fewer coding bits than PCM coding, and higher quantization levels of DPCM require fewer coding bits than lower quantization levels;
        (vi) wherein an overall bit budget for the block, as a block level bit budget, is divided equally amongst the sub-blocks as a sub-block budget, with remaining bits from the sub-block budget being shared as refinement bits from one sub-block to another;
        (vii) wherein said joint mode decisions are made so that any remaining bits from one refinement bits are shared between sub-blocks to optimize coding;
        (viii) encoding mode decision and quantization parameter (qn) within a header of a bitstream output;
        (ix) generating entropy coded bits into the bitstream for each sub-block based on said joint mode decision; and
        (x) generating refinement bits based on information from the joint mode decision in combination with information on the number of bits left when generating entropy coded bits.

11. The apparatus recited in claim 10, wherein said exception case when maximum covered depth in either of the sub-blocks differs from minimum covered depth in either of the sub-blocks by at least one.

12. The apparatus recited in claim 11, wherein covered depth is determined by the number of covered bits per sample.

13. The apparatus recited in claim 10, wherein said programming is configured to perform said joint mode decision in response to a search process for maximizing joint coverage over a number of dimensions equal to the number of sub-blocks into which each block is divided.

14. The apparatus recited in claim 13, wherein each dimension of said search process has a range of choices that includes one choice for PCM and one choice for each available qn value when DPCM coding.

15. The apparatus recited in claim 13, wherein said programming is configured to use a two dimensional search process when making a joint mode decision when each block is divided into two sub-blocks.

16. A method of coding image data using embedded block coding, comprising:
    (a) coding image data independently for each block within a predetermined bit budget, during image data coding on a computer processor with associated non-transitory computer readable medium configured to process image data;
    (b) partitioning each said block into multiple sub-blocks which share said predetermined bit budget;
    (c) performing a joint mode decision for each said sub-block in which it is determined whether to code with differential pulse code modulation (DPCM) or pulse code modulation (PCM), and with a quantization number being determined for each sub-block having any DPCM coded pixels, and making the joint mode decision taking into account optimizing coding by using bit sharing between the sub-blocks;
    (d) wherein DPCM coding requires fewer coding bits than PCM coding, and higher quantization levels of DPCM require fewer coding bits than lower quantization levels;
    (e) dividing an overall bit budget for the block, as a block level bit budget, equally amongst the sub-blocks as a sub-block budget, and sharing remaining bits from the sub-block budget as refinement bits from one sub-block to another;
    (f) wherein said joint mode decisions are performed so that any remaining bits from one sub-block are shared as refinement bits with other sub-blocks to optimize coding;
    (g) encoding mode decision and quantization parameter (qn) within a header of a bitstream output;
    (h) generating entropy coded bits into the bitstream for each sub-block based on said joint mode decision; and
    (i) generating refinement bits based on information from the joint mode decision in combination with information on the number of bits left when generating entropy coded bits.

17. The method recited in claim 16, wherein said separating blocks into sub-blocks is performed in response to color partitioning, or spatial partitioning.

18. The method recited in claim 16, further comprising determining an exception case of said mode decision and making an alternative mode decision.

19. The method recited in claim 18:
    wherein the exception case arises when maximum covered depth in either of the sub-blocks differs from minimum covered depth in either of the sub-blocks by at least one; and
    wherein covered depth is determined by the number of covered bits per sample.

20. The method recited in claim 16:
wherein said joint mode decision is performed in response to a search process for maximizing joint coverage over a number of dimensions equal to the number of sub-blocks into which each block is divided; and
wherein each dimension of said search process has a range of choices that includes one choice for PCM and one choice for each available qn value when DPCM coding.

* * * * *